United States Patent
Hirano et al.

(10) Patent No.: US 6,231,633 B1
(45) Date of Patent: May 15, 2001

(54) GRANULAR COATED FERTILIZER AND METHOD FOR PRODUCING THE SAME

(75) Inventors: Yasuhiro Hirano, Chiba; Yutaka Yamaguchi, Tsukuba; Hiroshi Nakamura, Tsuchiura, all of (JP)

(73) Assignee: Sumitomo Chemical Company Limited, Osaka (JP)

(*) Notice: Subject to any disclaimer, the term of this patent is extended or adjusted under 35 U.S.C. 154(b) by 0 days.

(21) Appl. No.: 09/313,985

(22) Filed: May 19, 1999

(30) Foreign Application Priority Data

May 22, 1998 (JP) .................................................. 10-141549

(51) Int. Cl.[7] ...................................................... C05G 5/00
(52) U.S. Cl. .................................. 71/64.07; 71/28; 71/29; 71/30; 71/33; 71/58; 71/63; 71/64.02; 71/64.11
(58) Field of Search ............................... 71/64.02, 64.07, 71/28, 64.11, 29, 30, 33, 58, 63

(56) References Cited

U.S. PATENT DOCUMENTS

| | | |
|---|---|---|
| 3,264,088 | 8/1966 | Hansen . |
| 3,264,089 | 8/1966 | Hansen . |
| 4,880,455 * | 11/1989 | Blank ........................................ 71/28 |
| 5,009,696 * | 4/1991 | Fujita et al. ......................... 71/64.07 |
| 5,310,785 * | 5/1994 | Hayakawa et al. .................. 71/64.07 |
| 5,538,531 * | 7/1996 | Hudson et al. ........................... 71/28 |

FOREIGN PATENT DOCUMENTS

| | | |
|---|---|---|
| 1-500661 | 3/1989 | (JP) . |
| 7-500560 | 1/1995 | (JP) . |
| 7-215789 | 8/1995 | (JP) . |
| 9-30883 | 2/1997 | (JP) . |
| 9-202683 | 8/1997 | (JP) . |
| 9-263474 | 10/1997 | (JP) . |

OTHER PUBLICATIONS

Chemical Abstracts 98:33824 (No date).*

* cited by examiner

Primary Examiner—Wayne Langel
(74) Attorney, Agent, or Firm—Sughrue, Mion, Zinn, Macpeak & Seas, PLLC

(57) ABSTRACT

Provided is a granular fertilizer coated with a thermosetting resin coating, characterized in that a dissolution rate of the fertilizer is retarded by containing a hydrophobic compound in at least one of the coating portion and the fertilizer portion thereof. The dissolution rate is further retarded than that of a conventional granular coated fertilizer coated with a thermosetting resin.

12 Claims, No Drawings

GRANULAR COATED FERTILIZER AND METHOD FOR PRODUCING THE SAME

BACKGROUND OF THE INVENTION

1. Field of the Invention

The present invention relates to a controlled-release (also referred to as slow-release, sometimes) granular coated fertilizer, and a method for producing the same. More particularly, the present invention relates to a controlled-release granular coated fertilizer, which is coated with a thermosetting resin such as urethane resin, epoxy resin or the like, and a method for producing the same.

2. Description of the Related Art

A so-called slow-release granular fertilizer wherein a dissolution rate of the fertilizer is controlled by coating or encapsulizing a granular fertilizer with a resin, sulfur, etc. has been used for years. For example, Japanese Patent Kokoku Publication Nos. 40-28927, 44-28457, 37-15382 and 42-13681 disclose various coating materials and coating methods.

U.S. Pat. No. 3,264,089 discloses a coated fertilizer wherein a coating material is a urethane resin made of a reaction product of a polyisocyanate compound and a polyol compound, while U.S. Pat. No. 3,264,088 discloses an epoxy resin coating material. With respect to a method for producing a coated fertilizer, comprising using a urethane resin as a coating material, Japanese Patent Kohyo Publication No. 1-500661 discloses a technique characterized in that an excessive amount of an isocyanate compound is reacted with a urea fertilizer on the surface to form a base coat and a polyol compound is reacted with excess isocyanate groups thereon. Japanese Patent Kohyo Publication No. 7-500560 discloses a technique characterized in that a mixed resin of a polyisocyanate compound and a polyol compound is coated to form each layer having a thickness of 10 to 30 μm which is then cured by treating with an amine mist.

However, these techniques have industrially disadvantageous problems because the object of realizing less coating defects and controlled dissolution of the fertilizer is not sufficiently satisfied or a complicated apparatus and complicated steps are required in the production.

In these methods, a dissolution rate of the fertilizer to the external environment is decided by the property of the resin or the kind of the fertilizer. Therefore, in order to retard the dissolution rate, it is effective to increase a coating film thickness of the resin. However, since a proportion of an effective fertilizer per unit weight of the coated fertilizer is decreased, it is necessary to apply a large amount of a coated fertilizer to soil. A large amount of the resin is required and, therefore, there arise a problem about cost and a problem that the productivity is lowered by prolongation of the time required to produce the coated fertilizer.

On the other hand, a technique of coating a fertilizer with a hydrophobic compound such as wax has been known, and Japanese Patent Kokoku Publication No. 6-2632 and Japanese Patent Kokai (laid-open) Publication No. 52-93561 disclose a method of wax coating to prevent hygroscopic fertilizer products from adhering each other.

In the coated fertilizer, which is coated with a resin, a problem of adhering of resins does not occur. Therefore, it is not necessary to add a hydrophobic compound.

An object of the present invention is to provide a granular coated fertilizer wherein a dissolution rate is further retarded than a slow-release granular coated fertilizer, which is coated with a thermosetting resin, and a method for producing the same.

SUMMARY OF THE INVENTION

The present invention is as described below.

[1] A granular coated fertilizer coated with a thermosetting resin, characterized in that a dissolution rate of the fertilizer is retarded by containing a hydrophobic compound in at least one of a coating portion and a fertilizer portion thereof.

[2] The granular coated fertilizer according to the item [1], wherein an amount of the hydrophobic compound is from 0.1 to 100 parts by weight based on 100 parts by weight of the thermosetting resin.

[3] The granular coated fertilizer according to the item [1] or [2], wherein the hydrophobic compound is selected from the group consisting of wax, fatty acid, fatty acid ester, higher alcohol, silicone and mixtures thereof.

[4] The granular coated fertilizer according to the item [1] or [2], wherein the thermosetting resin is an epoxy resin or a urethane resin.

[5] The granular coated fertilizer according to the item [4], wherein the urethane resin contains a polyisocyanate compound, a polyol compound and a curing catalyst as essential components therein.

[6] A method for producing a granular coated fertilizer comprising any one of the steps below:

(A) coating a granular fertilizer, to which a hydrophobic compound is previously added, with a thermosetting resin;

(B) coating a granular fertilizer with a thermosetting resin, to which a hydrophobic compound is previously added;

(C) coating a granular fertilizer with a thermosetting resin, with an adding of a hydrophobic compound intermittently or continuously, to a mixture of the granular fertilizer and the thermosetting resin, either during or after the granular fertilizer is coated with the thermosetting resin; or (D) using two or more steps of the above steps A to C in combination.

[7] The method for producing a granular coated fertilizer according to the item [6] comprising the steps of:

(1) placing the granular fertilizer into a rolling state;

(2) adding a liquid uncured thermosetting resin to the granular fertilizer in the rolling state in an amount that is enough to secure a layer thickness of 1 to 10 μm;

(3) coating surfaces of fertilizer granules of the granular fertilizer with the uncured thermosetting resin while maintaining the rolling state of the granular fertilizer;

(4) thermosetting the uncured thermosetting resin while maintaining the rolling state of the granular fertilizer; and (5) repeating the above steps (1) to (4) one or more times, in this order.

[8] The method according to item [6] or [7], wherein an amount of the hydrophobic compound is from 0.1 to 100 parts by weight based on 100 parts by weight of the thermosetting resin.

[9] The method according to the item [6] or [7], wherein the hydrophobic compound is selected from the group consisting of wax, paraffin, fatty acid, fatty acid ester, higher alcohol, silicone and mixtures thereof.

[10] The method according to the item [6] or [7], wherein the thermosetting resin is an epoxy resin or a urethane resin.

[11] The method according to the item [10], wherein the urethane resin contains a polyisocyanate compound, a polyol compound and a curing catalyst as essential components.

[12] The method according to the item [6] or [7], wherein the thermosetting resin has a gelation time of not more than 5 minutes at a coating temperature.

DETAILED DESCRIPTION OF THE INVENTION

The present invention will be described in detail hereinafter.

As the hydrophobic compound in the present invention, a so-called wax is used. Specific examples thereof include animal wax such as-beeswax, etc.; vegetable wax such as candelilla wax, carnauba wax, wood wax, ouricury wax, douglas fir bark wax, lice bran wax, jojoba wax, bayberry wax, etc.; mineral wax such as montan wax, peat wax, ozokerite-ceresin wax, etc.; petroleum wax such as paraffin wax, microcrystalline wax, semicrystalline wax, etc.; polymer wax such as polyethylene wax, copolymer wax obtained by polymerizing at least two monomeric units such as ethylene, propylene, butadiene, acrylic acid, etc.; and synthetic wax such as Fischer-Tropsch wax, chemically-modified hydrocarbon wax, substituted amide wax, etc.

The petroleum wax is not limited to a solid and includes, for example, hydrocarbons such as alkanes, paraffins, alkenes, olefins, alkynes, acetylenes, cycloalkanes, cycloalkenes, cycloalkynes, etc.; and aromatic hydrocarbons.

Examples of the fatty acid include hydrocarbon fatty acid such as capric acid, lauric acid, myristic acid, palmitic acid, stearic acid, arachic acid, behenic acid, oleic acid, erucic acid, linoleic acid, linolenic acid, ricinolic acid, etc., and alkali metal salts and alkali earth metal salts thereof.

Examples of the fatty acid ester include esters of the above fatty acid and alcohol having 1 to 4 carbon atoms, and esters of the above fatty acid and polyhydric alcohol such as glycerin.

Examples of the higher alcohol include those wherein a carboxyl group of the above aliphatic series is replaced by a hydroxyl group.

Examples of silicone include silicone oil such as polydimethylsiloxane, and silicone rubber.

Mixtures of the hydrohobic compound can be used. Among them, petroleum waxes such as paraffin wax, and polymer waxes such as polyethylene wax are particularly preferred.

The hydrophobic compound used in the present invention may be any of liquid, solid and semi-solid. In the case of the solid, a melting point is from 40 to 200° C. preferably from 50 to 150° C., and more preferably from 60 to 120° C. When the melting point is within this range, it is easy to handle it as a solid, and to disperse uniformly the hydrophobic compound in the product.

The amount of the hydrophobic compound used is from 0.01 to 100 parts by weight based on 100 parts by weight of the thermosetting resin. When the amount is smaller than this range, the effect of retarding the dissolution rate of the fertilizer is insufficient. On the other hand, even when the amount is larger than this range, the expected effect can not be obtained. The amount is preferably from 0.1 to 50 parts by weight, and more preferably from 1 to 20 parts by weight.

Regarding the granular coated fertilizer, which is coated with a thermosetting resin containing a hydrophobic compound, of the present invention, the dissolution rate of the fertilizer to the external environment is further retarded than a similar granular coated fertilizer containing no hydrophobic compound.

The sentence "the dissolution rate of the coated fertilizer to the external environment is retarded" means that, when a comparison in dissolution rate of the fertilizer is made by the same measuring method using test samples made under the same conditions except that the hydrophobic compound is formulated or not, the dissolution rate of the coated fertilizer of the present invention is retarded.

Specifically, the dissolution rate of the coated fertilizer to the external environment is measured by weighing a fixed amount of the test sample, adding water to the test sample, storing it in water at a fixed temperature, and tracing the concentration of the fertilizer in water. In the measurement of the dissolution rate of the fertilizer, it is preferred to measure under the conditions that the dissolution percentage of the fertilizer among a comparative reference is from 50 to 90%.

The degree of retardation of the dissolution rate is represented by a value enough to secure that the dissolution percentage of the resin-coated fertilizer of the present invention after a lapse of a fixed time is from 95 to 0.01%, preferably from 90 to 0.1%, more preferably from 80 to 1%, and still more preferably from 50 to 10% based on the comparative reference to which no hydrophobic compound is added. When the value is larger than this range, the meaning of adding the hydrophobic compound is less than a conventional granular fertilizer coated with a resin. On the other hand, when the value is smaller than this range, the fertilizer is not dissolved to the exterior environment and the effect as the fertilizer can not be exerted.

The method for producing the granular coated fertilizer of the present invention is not specifically limited, but the granular coated fertilizer should be produced by a method comprising any one of the steps below:

(A) coating a granular fertilizer, to which a hydrophobic compound is previously added, with a thermosetting resin;

(B) coating a granular fertilizer with a thermosetting resin, to which a hydrophobic compound is previously added;

(C) coating a granular fertilizer with a thermosetting resin with an adding of a hydrophobic compound intermittently or continuously, to a mixture of the granular fertilizer and the thermosetting resin, either during or after the granular fertilizer is coated with the thermosetting resin; or (D) using two or more steps of the above steps A to C in combination.

Specifically, the hydrophobic compound may be added when the granular fertilizer is made, and the hydrophobic compound may also be previously dispersed in the granular fertilizer. The hydrophobic compound may also be added, suspended and dissolved in resin components constituting the thermosetting resin, and it may also be added to the thermosetting resin before curing. The addition of the hydrophobic compound in step (C) may be conducted before, during or after coating with the thermosetting resin, and the hydrophobic compound may also be added, continuously or intermittently, or it may also be added at a time.

In short, in the granular coated fertilizer coated with the thermosetting resin, the hydrophobic compound may be contained in at least one of the coating portion and fertilizer portion.

As the thermosetting resin used in the present invention, known thermosetting reins can be used. Specific examples of the thermosetting resin include epoxy resin, urethane resin, unsaturated polyester resin, phenol resin, alkyd resin, xylene resin, melamine resin, furan resin, silicone resin and the like. If necessary, two or more kinds selected from them may be used in combination. Among such combinations, an epoxy resin and a urethane resin are preferred in view of workability and performance. Particularly, a urethane resin obtained by formulating a catalyst in a polyisocyanate compound and a polyol compound is preferred.

Explaining the urethane resin in more detail, the urethane resin is a generic term of a resin, which is three-dimensionally crosslinked by reacting the polyisocyanate compound with the polyol compound, while the uncured urethane resin in the present invention is a mixture of the polyisocyanate compound and the polyol compound, and is obtained without any reaction or by previously reacting a portion of them to such a degree that three-dimesional crosslinking does not occur. It is also a useful technique to add a catalyst in order to accelerate the reaction. The uncured resin may be in any form of solvent-free, solution and aqueous emulsion, but is preferably in the form of solvent-free and is liquid at the processing temperature.

The polyisocyanate compound is not specifically limited and specific examples thereof include toluene diisocyanate (referred to as TDI, sometimes), diphenylmethane diisocyanate (referred to as MDI, sometimes), naphthalene diisocyanate, tolidine diisocyanate, hexamethylene diisocyanate, isophorone diisocyanate, xylene diisocyanate and the like. If necessary, a mixture of them can also be used. Among them, MDI, TDI or an oligomer derived from them is preferably used.

The polyol compound is not specifically limited but includes, for example, polyether polyol obtained by poly-addition of ethylene oxide or propylene oxide using a polyhydric alcohol, amino alcohol or amine as an initiator, polyether type polyol such as polytetramethylene ether glycol obtained by polymerization of tetrahydrofuran, polyester type polyol obtained by reacting polyhydric alcohol, polyether polyol and a carboxylic acid compound. Taking biodegradability into consideration, it is also possible to use an OH group-containing natural product or a modified product thereof.

As a reaction catalyst of the urethane resin, known conventional catalysts can be used. Specific examples thereof include alkali compounds such as sodium hydroxide, potassium hydroxide, etc., organotin compounds such as dibutyltin laurate, dibutyltin maleate, etc., urea, triethylenediamine, N-methylmorpholine, N,N dimethylmorphiline, diazabicycloundecene, imidazole, ethylmethylimidazole, diazabicyclooctane, 2,4,6-tris (dimethylaminomethyl)phenol. Among them, a nitrogen atom-containing amine catalyst is preferably used.

These catalysts are used as they are, or in the form of an aqueous solution or a suspension. A solid catalyst is preferably used in the form of a ground powder.

If necessary, pigments or dyes for coloring, or inorganic/organic powders such as talc, mica, silica, carbon black, resin powder, etc. can also be used.

If necessary, surfactants can also be added.

The granular fertilizer is coated with the thermosetting resin in a rolling state. In a method of converting the granular fertilizer into the rolling state, utilized apparatus to perform the step are not specifically limited, such that known conventional apparatus can be used, with examples thereof including rotary pans, rotary drums and the like. Further utilizing apparatus with heating equipment is suitable for the realization of a high accuracy of coating and adjustment of a processing time.

The granular fertilizer used may be any conventional granular fertilizer. Specific examples thereof include nitrogen fertilizer such as urea, ammonium sulfate, ammonium chloride, ammonium phosphate, ammonium nitrate, ammonium nitrate lime, lime nitrogen, sodium nitrate, acetaldehyde condensed urea, etc.; phosphatic fertilizer such as calcined phosphate, processed phosphatic fertilizer, double superphosphate, mixed phosphatic fertilizer, etc.; potash fertilizer such as potassium chloride, potassium sulfate magnesia, potassium bicarbonate, potassium silicate fertilizer, etc.; compound fertilizer such as potassium phosphate fertilizer, potassium nitrate fertilizer, etc.; organic fertilizer.; and granular fertilizer obtained by granulation of a mixture of these fertilizers using a per se known method. A particle diameter of the granular fertilizer is not specifically limited, but is preferably within a range from 1 to 5 mm.

In the method of producing the granular coated fertilizer of the present invention, step (4) of heating the granular fertilizer in the rolling state to a predetermined processing temperature is included. As the processing temperature, a gelation time of the uncured resin is within 5 minutes, and more preferably within 3 minutes. In step (2) of adding the uncured resin to particles in the rolling state, airesin composition prepared by previously formulating a curing agent and a catalyst is incorporated by the method such as addition, spray or the like. There can also be used a method of separately adding a chief agent, a curing agent and a catalyst and mixing the respective components when the fertilizer particles are coated with the resin. In the case for the urethane resin for example, a polyisocyanate compound as a chief agent and a polyol compound as a curing agent coupled with a catalyst are used.

The amount of the resin to be incorporated at a time is adjusted so that a coating film thickness is from 1 to 10 $\mu$m. More preferably, the film thickness is not less than 2 $\mu$m and not more than 6 $\mu$m. When the film thickness is not more than 1 $\mu$m, the number of coating times is too large and it becomes disadvantageous industrially. On the other hand, when the film thickness is not less than 10 $\mu$m, the following problem arises. That is, in the method of the present invention, when a liquid uncured resin is incorporated in a fertilizer in a rolling state, a uniform uncured resin layer is first formed on the surface of particles by rolling of the particles and, at the same time, the curing reaction of the resin proceeds. In this case, thickening of the resin gradually occurs along with the reaction and the resin becomes thready. In that case, adhesion of the resin increases and the fertilizer particles are adhered each other to form a mass of a lot of particles and, therefore, the mass can not be taken apart into original primary particles. Even if the mass can be taken apart into the particles, there is a fear of damaging the resin surface. When the coating film thickness is not less than 10 $\mu$m, the problem as described above occurs and it is difficult to coat each particle uniformly with the uncured resin. The present inventors consider that, when the thickness of the resin film is large, a force of separating the particles that are adhered to each other by the rolling of the particles becomes insufficient. Anyway, in case of coating with a thick resin film at a time, defects described above are caused by a conventional rolling type coating method and it is difficult to produce a desired granular fertilizer coated with a resin.

In the step as described above, the granular fertilizer coated with the uncured resin is maintained in the rolling state as it is and then the resin is cured. The term "curing" used herein does not require complete curing and it refers to a state where the resin becomes free from threadiness by passing through a gel point. In such a state, the particles are not agglomerated each other along with the adhesion of the resin and are easily ground and, therefore, a next uncured resin can be added. As far as this object can be accomplished, the resin component may be added to the fertilizer, intermittently or continuously.

According to the production method of the present invention, a granular fertilizer coated with a resin in a desired film thickness can be obtained by repeating the above steps a plurality of times. The film thickness of the coating resin of the product varies depending on the desired dissolution pattern, but is preferably within a range from 20 to 200 μm.

If necessary, the final coated fertilizer may also be subjected to a step of sufficiently maintaining at a predetermined curing temperature to perform complete curing of the resin. It is also a useful technique to add inorganic fine powders such as clay to the surface of the coated fertilizer to prevent agglomeration of the fertilizer or to prevent floating on fertilizer application.

The granular coated fertilizer of the present invention is used in a conventionally known field, but is used for fertilizing to a shrubbery plant provided at the position where it is humanly difficult to fertilize, for example, a divider strip of open road, expressway, etc., and can be used in a large-scale farm whose fertilizing area is wide.

EXAMPLES

The following Examples further illustrate the present invention in detail but are not to be construed to limit the scope thereof.

Reference Example 1

2 kg of a granular urea (average particle diameter: 3.4 mm) was charged in a temperature-controllable inclined pan type rolling granulator equipped with a hot-air generator (pan diameter: 520 mm) and a granular fertilizer was converted into a rolling state by rotating at 20–30 rpm. The temperature of the charged granular urea is maintained at 70–75° C. by heating the granulator, thereby to maintain the rolling state. Uncured urethane resin composition obtained by mixing 4.1 g of Polymeric MDI (trade name: Sumidule 44V10, manufactured by Sumitomo Bayer Urethane Co., Ltd.) as a coating resin, 5.3 g of a branched polyether type polyol (trade name: Sumifen TM, manufactured by Sumitomo Bayer Urethane Co., Ltd.) and 0.1 g of 2,4,6-tris(dimethylaminomethyl)phenol as an amine catalyst with stirring, were added quickly to the heated granular urea in the rolling state. Here, the uncured urethane resin composition was liquid at room temperature.

A gelation time of the uncured urethane resin used in this example was 2 minutes and 30 seconds at 65° C. The gelation time is measured according to JIS K5909. The amount of the resin charged is 0.5% by weight based on the fertilizer. When the fertilizer having the particle diameter is coated, the film thickness of the coating resin is about 3.1 μm.

It was confirmed by a visual observation that the surface of the granular fertilizer is coated with the charged resin, almost uniformly, over about 30 seconds. Three minutes after charging the resin, a portion of the sample was taken out. As a result, the resin was in a state of being free from adhesion. The above step was repeated 16 times every three minutes to coat the fertilizer with the resin in the amount of 8% by weight. Finally, the granular fertilizer coated with the resin was maintained at 70–75° C. for 10 minutes to completely cure the resin, thereby obtaining a granular fertilizer coated with a urethane resin. The time required to conduct the whole of the steps is about 1 hour, such that this method was an industrially advantageous method.

The results of SEM observation show that the coating weight of the resin by the step, that is, the thickness of the resin film is about 50 μm.

The fertilizer dissolution behavior at 25° C. of the resin-coated granular fertilizer made by the above step was evaluated. As a result, the coated urea was dissolved in the amount of 80% of the fertilizer for about 85 days.

The evaluation of the fertilizer dissolution was conducted by the method (e.g. "Detailed Explanation of Fertilizer Analysis", edited by Masayoshi KOSHINO, 1988) proposed by Environmental Technical Laboratory of the Ministry of Agriculture, Forestry and Fisheries.

Example 1

In almost the same manner as in Reference Example 1 except for using a branched polyether type polyol (trade name: Sumifen TM, manufactured by Sumitomo Bayer Urethane Co., Ltd.) to which a polyethylene wax (trade name: Neowax CL-70, melting point: 70–80° C., manufactured by Yasuhara Chemical Co.) is added, a resin-coated fertilizer containing a hydrophobic substance was made. The amount of the resin used is 8% by weight based on the fertilizer similar to Reference Example 1, and the total amount of the polyethylene wax used is 5 parts based on 100 parts of the urethane resin component.

Examples 2–18

In the same manner as in Example 1 except for changing the amount of the urethane resin used, kind of the hydrophobic compound or method of adding the hydrophobic compound, samples were made by using the method as shown in Table 1.

A change in dissolution percentage of a urea fertilizer with a lapse of time of these samples in water (25° C.) was traced. The dissolution behavior of the fertilizer is shown in Table 2.

In Table 1, the amount of the resin used (% by weight based on the fertilizer) represents an amount (% by weight) of the urethane resin based on the weight of the urea fertilizer. The hydrophobic compound used is a polyethylene wax (trade name: Neowax CL-70, melting point: 70–80° C., manufactured by Yasuhara Chemical Co.) or liquid paraffin (reagent, manufactured by Wako Pure Chemical Industries, Ltd.). The amount of the hydrophobic compound used was represented by parts by weight based on 100 parts by weight of the urethane resin.

As the method of adding the hydrophobic compound shown in Table 1, "Previously dispersed in polyol" is the case where the hydrophobic compound was used after previously melting in the branched polyether type poyol (trade name: Sumifen TM, manufactured by Sumitomo Bayer Urethane Co., Ltd.) with heating, and "Fertilizer is pretreated" is the case where the hydrophobic compound was added to the urea fertilizer and dispersed uniformly and then urethane resin coating was conducted.

Comparative Examples 1–3

In the same manner as in Reference Example 1 except for changing the amount of the urethane resin based on the weight of the urea fertilizer to 6, 7 or 8%, each sample was made, and a change in dissolution percentage of a urea fertilizer with a lapse of time of these samples in water (25° C.) was traced. The results are shown in Table 1 and Table 2.

TABLE 1

| | Amount of resin used % by weight based on fertilizer | Hydrophobic compound Kind | Amount of hydrophobic compound Based on 100 parts of resin | Hydrophobic compound Method of addition |
|---|---|---|---|---|
| Comparative example 1 | 6 | No addition | — | — |
| Comparative example 2 | 7 | No addition | — | — |
| Comparative example 3 | 8 | No addition | — | — |
| Example 2 | 6 | Polyethylene wax | 5 parts | Previously dispersed in polyol |
| Example 3 | 7 | Polyethylene wax | 5 parts | Previously dispersed in polyol |
| Example 4 | 8 | Polyethylene wax | 5 parts | Previously dispersed in polyol |
| Example 5 | 9 | Polyethylene wax | 5 parts | Previously dispersed in polyol |
| Example 6 | 10 | Polyethylene wax | 5 parts | Previously dispersed in polyol |
| Example 7 | 12 | Polyethylene wax | 5 parts | Previously dispersed in polyol |
| Example 8 | 6 | Polyethylene wax | 5 parts | Fertilizer is pre-treated |
| Example 9 | 7 | Polyethylene wax | 5 parts | Fertilizer is pre-treated |
| Example 10 | 8 | Polyethylene wax | 5 parts | Fertilizer is pre-treated |
| Example 11 | 6 | Polyethylene wax | 3 parts | Previously dispersed in polyol |
| Example 12 | 7 | Polyethylene wax | 3 parts | Previously dispersed in polyol |
| Example 13 | 8 | Polyethylene wax | 3 parts | Previously dispersed in polyol |
| Example 14 | 7 | Polyethylene wax | 1 parts | Previously dispersed in polyol |
| Example 15 | 8 | Polyethylene wax | 1 parts | Previously dispersed in polyol |
| Example 16 | 6 | Paraffin | 5 parts | Previously dispersed in polyol |
| Example 17 | 7 | Paraffin | 5 parts | Previously dispersed in polyol |
| Example 18 | 8 | Paraffin | 5 parts | Previously dispersed in polyol |

TABLE 2

| | Lapsed time (days) | | | | | | | | | |
|---|---|---|---|---|---|---|---|---|---|---|
| | 0 | 7 | 26 | 49 | 70 | 91 | 116 | 133 | 158 | 174 |
| | Dissolution percentage of fertilizer (%) | | | | | | | | | |
| Comparative example 1 | 0 | 4 | 34 | 69 | 82 | 88 | 92 | 91 | — | — |
| Comparative example 2 | 0 | 2 | 22 | 63 | 78 | 86 | 92 | 94 | — | — |
| Comparative example 3 | 0 | 1 | 8 | 45 | 66 | 78 | 86 | 92 | — | — |
| Example 2 | 0 | 0 | 0 | 0 | 4 | 15 | 35 | 50 | 65 | 72 |
| Example 3 | 0 | 0 | 0 | 0 | 1 | 6 | 23 | 39 | 59 | 68 |
| Example 4 | 0 | 0 | 0 | 0 | 0 | 3 | 10 | 19 | 37 | 49 |
| Example 5 | 0 | 0 | 0 | 0 | 2 | 9 | 23 | 36 | 55 | 64 |
| Example 6 | 0 | 0 | 0 | 0 | 3 | 12 | 30 | 42 | 59 | 66 |
| Example 7 | 0 | 0 | 0 | 0 | 0 | 4 | 15 | 28 | 47 | 57 |
| Example 8 | 0 | 0 | 1 | 3 | 17 | 41 | 60 | 68 | 77 | 80 |
| Example 9 | 0 | 0 | 0 | 3 | 20 | 47 | 68 | 75 | 80 | 82 |
| Example 10 | 0 | 0 | 0 | 0 | 4 | 22 | 50 | 62 | 75 | 79 |
| Example 11 | 0 | 0 | 1 | 3 | 17 | 43 | 65 | 74 | 81 | 83 |
| Example 12 | 0 | 0 | 0 | 0 | 10 | 36 | 61 | 70 | 80 | 82 |
| Example 13 | 0 | 0 | 0 | 0 | 1 | 6 | 25 | 43 | 63 | 70 |
| Example 14 | 0 | 0 | 0 | 8 | 36 | 59 | 76 | 81 | 86 | 88 |
| Example 15 | 0 | 0 | 0 | 3 | 22 | 49 | 68 | 75 | 84 | 84 |
| Example 16 | 0 | 0 | 0 | 10 | 35 | 58 | 75 | 81 | 87 | 87 |
| Example 17 | 0 | 0 | 1 | 7 | 30 | 53 | 71 | 77 | 84 | 85 |
| Example 18 | 0 | 0 | 0 | 2 | 13 | 36 | 59 | 68 | 79 | 80 |

The granular coated fertilizer of the present invention is capable of further retarding the dissolution rate than a conventional slow-release coated fertilizer, which is merely coated with a thermosetting resin.

By using the granular coated fertilizer of the present invention, it is possible to perform a fertilizing design according to the purpose, environment and use more widely than a conventional one. Furthermore, the granular coated fertilizer of the present invention can be used in fertilizing to a shrubbery plant provided at the position where it is humanly difficult to compose, for example, a divider strip of an open road, expressway, etc., and can be used in a large-scale farm whose fertilizing area is wide.

Since the effect of fertilizer can be maintained for a long period of time, it is possible to reduce time and cost required to fertilizing. Furthermore, since it is not necessary to apply the fertilizer in a larger amount than that required, burden to the environment is reduced.

Furthermore, since the dissolution rate of the fertilizer can be further retarded than a conventional resin-coated fertilizer, the dissolution rate can be controlled while reducing the amount of the resin used, by using the technique of the present invention, thereby making it possible to realize reduction of the cost of the resin used, reduction of burden to the environment, improvement in effect of fertilizer per unit weight, etc. As described above, the technique of the present invention is markedly useful in industrial application.

What is claimed is:

1. A granular coated fertilizer comprising a fertilizer portion and a coating of a thermosetting resin, wherein at least one member selected from the group consisting of said fertilizer portion and said coating contains a hydrophobic compound that retards a dissolution rate of the fertilizer.

2. The granular coated fertilizer according to claim 1, wherein present in an amount of the hydrophobic compound is from 0.1 to 100 parts by weight based on 100 parts by weight of the thermosetting resin.

3. The granular coated fertilizer according to claim 1 or 2, wherein the hydrophobic compound is selected from the group consisting of wax, fatty acid, fatty acid ester, higher alcohol, silicone, and mixtures thereof.

4. The granular coated fertilizer according to claim 1 or 2, wherein the thermosetting resin is an epoxy resin or a urethane resin.

5. The granular coated fertilizer according to claim 4, wherein the urethane resin contains a polyisocyanate compound, a polyol compound and a curing catalyst.

6. A method for producing a granular coated fertilizer comprising the step of:

(A) coating a granular fertilizer, to which a hydrophobic compound is previously added, with a thermosetting resin;

(B) coating a granular fertilizer with a thermosetting resin, to which a hydrophobic compound is previously added;

(C) coating a granular fertilizer with a thermosetting resin while adding a hydrophobic compound intermittently or continuously, to a mixture of the granular fertilizer and the thermosetting resin, either during or after the granular fertilizer is coated with the thermosetting resin; or (D) using two or more steps of steps A to C in combination.

7. The method for producing a granular coated fertilizer according to claim 6 comprising the steps of:

(1) placing the granular fertilizer into a rolling state;

(2) adding a liquid uncured thermosetting resin to the granular fertilizer in the rolling state in an amount enough to secure a layer thickness of 1 to 10 $\mu$m;

(3) coating the surfaces of fertilizer granules of the granular fertilizer with the uncured thermosetting resin while maintaining the rolling state of the granular fertilizer;

(4) thermosetting the uncured thermosetting resin while maintaining the rolling state of the granular fertilizer; and (5) repeating the above steps (1) to (4) one or more times, in this order.

8. The method according to claim 6 or 7, wherein the hydrophobic compound is present in an amount of from 0.1 to 100 parts by weight based on 100 parts by weight of the thermosetting resin.

9. The method according to claim 6 or 7, wherein the hydrophobic compound is selected from the group consisting of wax, fatty acid, fatty acid ester, higher alcohol, silicone and mixtures thereof.

10. The method according to claim 6 or 7, wherein the thermosetting resin is an epoxy resin or a urethane resin.

11. The method according to claim 10, wherein the urethane resin contains a polyisocyanate compound, a polyol compound and a curing catalyst.

12. The method according to claim 6 or 7, wherein the thermosetting resin has a gelation time of not more than 5 minutes.

* * * * *